United States Patent
Gutin et al.

(10) Patent No.: US 8,218,966 B2
(45) Date of Patent: Jul. 10, 2012

(54) TECHNIQUE FOR SECURING TRANSMISSION OF DATA ALONG AN OPTICAL COMMUNICATION LINE

(75) Inventors: Michael Gutin, Petach-Tikva (IL); Uri Mahlab, Or Yehuda (IL)

(73) Assignee: ECI Telecom Ltd., Petach Tikva (IL)

( * ) Notice: Subject to any disclaimer, the term of this patent is extended or adjusted under 35 U.S.C. 154(b) by 290 days.

(21) Appl. No.: 12/667,862

(22) PCT Filed: Jun. 29, 2008

(86) PCT No.: PCT/IL2008/000887
§ 371 (c)(1),
(2), (4) Date: Jan. 5, 2010

(87) PCT Pub. No.: WO2009/007948
PCT Pub. Date: Jan. 15, 2009

(65) Prior Publication Data
US 2010/0196015 A1    Aug. 5, 2010

(30) Foreign Application Priority Data
Jul. 11, 2007    (IL) .......................................... 184534

(51) Int. Cl.
H04B 10/00    (2006.01)
(52) U.S. Cl. ................. 398/40; 398/39; 398/45
(58) Field of Classification Search .............. 398/12, 398/45–46, 67–68, 141, 39–40
See application file for complete search history.

(56) References Cited

U.S. PATENT DOCUMENTS

| | | |
|---|---|---|
| 4,847,831 A | 7/1989 | Spiesman et al. |
| 5,633,741 A * | 5/1997 | Giles ................................ 398/79 |
| 5,777,761 A * | 7/1998 | Fee .................................... 398/7 |
| 6,211,978 B1 * | 4/2001 | Wojtunik .......................... 398/9 |
| 7,072,583 B2 | 7/2006 | Shino et al. |

(Continued)

FOREIGN PATENT DOCUMENTS

| | | |
|---|---|---|
| EP | 1209830 A | 5/2002 |
| WO | 0048339 A | 8/2000 |

OTHER PUBLICATIONS

Salamon et al.,"Secure optical communications utilizing PSK modulation, polarization multiplexing and coherent digital homodyne detection with wavelength and polarization utility," IEEE military communications conference, 2003, pp. 274-282, vol. 1, Boston, MA, USA.
Walid et al.,"Security for FTTx Optical Access Networks," Local computer networks proceedings 2006 31st IEEE conference on IEEE PI, 2006, pp. 221-228.

(Continued)

*Primary Examiner* — Dzung Tran
(74) *Attorney, Agent, or Firm* — Browdy and Neimark, PLLC (57) ABSTRACT

A technique for securing data transmission via an optical communication line comprising an optical fiber extending between a first network element and a second network element; the technique comprises conveying a first optical signal carrying data via the optical fiber from the first network element towards the second network element at a predetermined optical wavelength, and conveying a second optical signal at the same predetermined optical wavelength via the same fiber in the opposite direction to create within the optical fiber a combined optical signal such that combination of the first and second optical signals is adapted to hamper an unauthorized non-intrusive extraction of the first optical signal from the combined optical signal.

16 Claims, 5 Drawing Sheets

U.S. PATENT DOCUMENTS

| | | | |
|---|---|---|---|
| 2002/0027689 A1* | 3/2002 | Bartur et al. | 359/152 |
| 2004/0008989 A1* | 1/2004 | Hung | 398/69 |
| 2004/0037556 A1 | 2/2004 | Matz et al. | |
| 2005/0089332 A1* | 4/2005 | Margalit | 398/139 |
| 2006/0153491 A1 | 7/2006 | Murphy et al. | |
| 2006/0280304 A1* | 12/2006 | Waters | 380/256 |

OTHER PUBLICATIONS

Shaneman et al.,"Optical network security: technical analysis of fiber tapping mechanisms and methods for detection and prevention," military communications conference, 2004, pp. 711-716, vol. 2, Monterey, CA, USA.

* cited by examiner

TECHNIQUE FOR SECURING TRANSMISSION OF DATA ALONG AN OPTICAL COMMUNICATION LINE

FIELD OF THE INVENTION

The invention relates to the field of telecommunications, more particularly to technologies for providing secured data transmission in optical communication lines.

BACKGROUND OF THE INVENTION

Secure data transmission in optical networks is one of the hottest topics today. Surprisingly, quite a few real solutions have been proposed which would prevent intrusion to the optical networks and/or prevent interception of information by intruders.

For example, US 2004037556AA describes systems and methods for actively monitoring and managing the integrity of an optical fiber communications link. The optical fiber link integrity is monitored to guard against intrusions and other security breaches. In one embodiment, a local and a remote active monitoring system are coupled by four fiber paths that provide primary and back-up transmit and receive paths between communication equipment. In one embodiment, a security light signal is transmitted using a secondary wavelength that differs from the wavelength used to transmit a user data light signal and travels in an opposite direction relative to the user data light signal. An active monitoring system monitors both administrative information contained within the security light signal and the intensity of the security light signal to manage the integrity of the fiber optic link. Methods are provided to characterize events impacting the fiber optic link integrity.

The above technology only provides monitoring of the fiber integrity.

A problem of possible interception of data by an intruder and a problem of securing the data are not even discussed.

Another approach utilizes a polarization detector. US2006153491AA describes an intrusion detection system for use on single mode optical fiber, using a polarimeter. In the US2006153491AA, a telecommunications optical fiber is secured against intrusion by detecting manipulation of the optical fiber prior to an intrusion event. This can be used in a non-locating system where the detection end is opposite to the transmit end, or in a locating system which uses Fresnel reflections and Rayleigh backscattering to the transmit end to detect and then locate the motion. The Rayleigh backscattering time sliced data can be stored in a register until an intrusion event is detected. The detection is carried out by a polarization detection system which includes an optical splitter which is manufactured in simplified form for economic construction. This uses a non-calibrated splitter and less than all four of the Stokes parameters. It can use a polarimeter type function limited to linear and circular polarization or two linear polarizers at 90 degrees.

The above solution also deals with detecting cases of rude physical intrusion into the optical transmission line and does not discuss a problem of securing data in cases when optical fibers are not damaged.

U.S. Pat. No. 4,847,831A describes a bidirectional repeater for Manchester encoded data (MED) signals present on a coaxial cable and fiber optic cable forming the transmission media of a local area network. The repeater receives and then reconstitutes the MED signals present on the coaxial cable and transmits the reconstituted MED signals onto the fiber optic cable. MED data present on the fiber optic cable is received, reconstituted, and transmitted onto the coaxial cable. Signals can be received from only one cable at any one time. Transmission of reconstituted MED signals is terminated when a special set of MED signals identifying the end of a transmission by a module of the network is received.

To the best of the Applicant's knowledge, most of the prior art solutions in the field deal with detecting a fiber cut/damage, while none of them propose a solution for preventing interception of a data signal, effective in cases when the interception is performed without cutting the optical fiber (i.e., in cases where the eavesdrop cannot be revealed by detecting a vulgar fiber cut).

SUMMARY AND OBJECT OF THE INVENTION

It is the object of the invention to organize data transmission via an optical communication line in such a manner, that a skilled intruder trying to intercept information without cutting the optical fiber will be unable to obtain any "legible" information from the communication line.

The Inventors have realized and used the following fact. When trying to to perform a so-called non-intrusive interception of data, i.e., interception without cutting the optical fiber, the interloper (interceptor) has serious difficulties firstly in obtaining a portion of energy of the signal transmitted via the fiber, and secondly (if the first operation is successful)—in analyzing the obtained signal. For example, it is almost impossible to determine direction(s) of transmission of the obtained signal without cutting the fiber.

According to a first aspect of the invention, the above object can be achieved by providing a method for securing data transmission via an optical communication line comprising a first optical fiber extending between a first network element (e.g. a node) and a second network element, the method comprising:

conveying a first (e.g. information) optical signal carrying said data via the first optical fiber from the first network element towards the second network element at a predetermined optical wavelength;

conveying a second (e.g. interference) optical signal via the first optical fiber in the opposite direction (say, from the second network element towards the first network element) at the same predetermined optical wavelength thereby creating within the first optical fiber a combined optical signal at said wavelength, wherein the combination of optical signals is adapted for hampering an unauthorized extraction of the first optical signal from the combined optical signal, e.g. in case of an attempt of non-intrusive interception of data carried by the first optical signal.

The proposed method substantially lowers chances of non-intrusive interception of the data from the first optical fiber in its section where the combined optical signal is created, up to completely preventing such interception.

The term "conveying" as used herein with respect to the first and/or second optical signal(s), should be understood also to encompass in certain cases the transmission of the respective optical signal.

The optical communication line functions in this case as a single fiber bidirectional communication line. The term "optical fiber" should be understood as a physically separate fiber optic link, possibly comprising passive optical elements between the first network element and the second network elements.

If more than one optical channels (having different wavelengths) are established via the first optical fiber, optical signals respectively transmitted via each of the optical channels may be secured in the similar manner.

The second (interference) signal may be any disruptive signal which, in combination with the first (information) signal produces the combined signal being difficult for de-combining by an interceptor. For example, the second optical signal may comprise: an analog noise signal, a digital noise signal, a digital signal having at least one parameter similar to the corresponding parameter(s) of the first, information signal (i.e., bit rate, power, modulation format—PSK, QPSK, etc., line coding—NRZ, RZ).

According to one version of the method, in order to further hamper the distinguishing of the first optical signal in said combined optical signal and further separation of the first signal, the method may comprise applying a polarization perturbation to at least one of two signals: the first (information) optical signal and the second (interference) optical signal.

The polarization perturbation may be provided by controlling the polarization of an optical signal, in a predetermined manner or randomly.

The method may also comprise controllably changing parameters and/or polarization of the second optical signal (optionally, based on monitoring parameters and/or polarization of the first optical signal), to further complicate distinguishing of the first signal from the second signal.

Transmitters of the first and second optical signals may allow changing the wavelength of transmission, for example the transmitters may be tunable. In case of any transmission failure at the predetermined optical wavelength, or in other to further complicate distinguishing of the information signal for an interceptor, the method steps may be performed as follows:

from time to time switching transmission of the first optical signal to carry said data at another predetermined optical wavelength, but without changing direction of its transmission;

from time to time switching transmission of the second optical signal to said another predetermined optical wavelength, but without changing direction of its transmission;

wherein the switching of the first signal is synchronized with the switching of said second signal.

In addition, the method may comprise a step of controllably interrupting the first optical signal from time to time, and preferably with replacing the first signal with a first replacement optical signal transmitted via the first optical fiber at the same predetermined wavelength. That step can be performed either by using one and the same transmitter of the first optical signal, or by using two different transmitters.

Similarly mutatis mutandis, the method may comprise a step of controllably interrupting the second optical signal from time to time, preferably with replacing the second optical signal with a second replacement optical signal transmitted via the first optical fiber at the same predetermined wavelength. In the analogous manner, the step of controllably interrupting the second optical signal (and if desired, replacing it) may be performed either by using one and the same means for transmitting the second optical signal, or by using two different signal transmitting means.

Simple interruption of the first and second signals, if performed, should preferably be made synchronously.

Alternatively or in addition, the method may further comprise the following steps:

utilizing in said optical communication line at least a second optical fiber (if exists), extending between the first network element and the second network element;

transmitting a third optical signal via said second optical fiber from the first network element to the second network element;

from time to time, switching the first optical signal (the information signal being transmitted from the first network element to the second network element), between the first optical fiber and the second optical fiber, and synchronously with that switching the third optical signal (being transmitted from the first network element to the second network element), between the second optical fiber and the first optical fiber so that the third optical signal be transmitted via the first optical fiber at the predetermined optical wavelength;

thereby further hampering distinguishing of the first (information) optical signal in the first optical fiber for the possible interloper.

The third optical signal may be another information signal, however, it may be just an interference signal in the meaning mentioned above; in any case the third optical signal plays part of the first replacement optical signal when switched into the first optical fiber.

In the second optical fiber, the third optical signal may be transmitted at the same predetermined optical wavelength, so the switching of the third signal to the first optical fiber will not require any wavelength conversion.

In case the third optical signal is transmitted via the second optical fiber at another optical wavelength, the method should comprise a wavelength conversion operation for the third signal so that it could be added to the first optical fiber at the predetermined wavelength.

In any case of modifying the first (information) optical channel such as interrupting, temporarily replacing it with another signal, changing its optical channel, switching it to another optical fiber etc., the first optical signal must be received at the second network element at any but preliminarily agreed receiver (i.e., associated with a specific fiber and a specific optical wavelength), and at any but preliminarily agreed time periods. The same applies to any information signal in the system. If it is not received, further security measures should preferably be taken, which will be discussed in the description.

The method may further comprise transmitting a fourth optical signal via the second optical fiber from the second network element to the first network element. Similarly to that mentioned above with respect to the third signal, the fourth optical signal may be yet another information signal or yet another interference signal.

The optical communication line having two optical fibers may thus function as a double (dual) fiber bidirectional communication line.

It should be kept in mind that the optical communication line may comprise a plurality (N) of optical fibers (N≧2) and may operate as an N-fiber bidirectional transmission line. It should also be kept in mind that the step of switching of the first optical signal may be performed not only with respect to the third optical signal, but—alternatively or in addition to the third optical signal—with respect to any additional optical signal transmitted in the same direction via one of additional optical fibers of the plurality.

The method may thereby provide the secured data transmission not only to the first optical signal, but, in the symmetric manner, to one or more other optical signals transmitted in any direction via the N-fiber bidirectional optical communication line.

In order to further complicate interception of data transmitted in the first optical signal via the optical communication line comprising at least the first optical fiber and the second optical fiber, and wherein the first optical signal and the second optical signals are transmitted via the first optical fiber in two opposite directions, and the third and the fourth optical signals are transmitted via the second optical fiber in two opposite directions, the method further comprises switching, from time to time, the second optical signal (being transmitted from the second network element to the first network element), between the first optical fiber and the second optical fiber, and synchronously with that switching the fourth optical signal (being transmitted from the second network element to the first network element), between the second optical fiber and the first optical fiber so that the fourth optical signal is transmitted via the first optical fiber at the predetermined optical wavelength.

The above reservations concerning possible wavelength conversion operations with respect to the third optical signals can be applied to the fourth optical signal "mutatis mutandis".

Similarly, it should be kept in mind that if the communication line comprises a plurality N of optical fibers (N>2), the step of switching of the second optical signal may be performed not only with respect to the fourth optical signal, but—alternatively or in addition—with respect to any additional optical signal transmitted in the same direction via one of additional optical fibers of the plurality.

Preferably, for further improving security of data transmission, the method may comprise a step of monitoring receipt of the first optical signal at the second network element and, in case of determining a failure in transmission of the first optical signal, urgently ceasing transmission of the second optical signal via the optical fiber along which, and at the optical wavelength using which said first optical signal should have been transmitted.

Symmetrically, for further security, the method may comprise a step of monitoring receipt of the second optical signal at the first network element and, in case of determining a failure in transmission of the second optical signal, urgently ceasing transmission of the first optical signal via that optical fiber along which, and at that optical wavelength using which said second optical signal should have been transmitted.

In the analogous manner, the method may comprise monitoring of receipt of at least one other optical signal (say, the third optical signal), with suitably ceasing transmission of its "mating" signal (say, the fourth optical signal) via the optical fiber and the optical channel in which the suitable combined signal should have been created.

For the case of N-fiber (N≧2) communication optical line, the method may comprise providing further security measures by applying a polarization perturbation to at least one optical signal among at least the first, the second, the third and the fourth optical signals.

The described method of secure data transmission, most probably, will be used in combination with one or more steps for detecting fiber cut or other fiber damages in order to determine, manifest and prevent intrusive manipulations with the optical communication line.

According to a second aspect of the invention, there is provided a system for secure transmission of data via an optical communication line comprising at least a first optical fiber extending between a first network element and a second network element;

the system comprising:

a first transmitter associated with the first network element, for transmitting a first (for example, information) optical signal carrying the data via the first optical fiber from the first network element to the second network element at a predetermined optical wavelength;

means for transmitting a second (interfering) optical signal via the first optical fiber in the opposite direction, from the second network element to the first network element, at the same predetermined optical wavelength to create a combined optical signal at said wavelength within the first optical fiber, wherein the second optical signal being that which hampers (complicates) non-intrusive separation of the first optical signal from said combined optical signal.

The above-mentioned equipment for data security is provided for a specific optical channel characterized by said predetermined optical wavelength. If more than one optical channels (having different wavelengths) carrying data to be secured are established via the first optical fiber, the system may comprise one or more additional sets of said equipment for data security in one or more respective optical channels.

In the described system, said first transmitter may be tunable and capable of switching, from time to time, to transmit the first optical signal carrying said data at another predetermined optical wavelength;

said means for transmitting the second optical signal may be capable of switching, from time to time, to transmit the second optical signal at said another predetermined optical wavelength;

wherein the switching of said first transmitter and the switching of said means for transmitting the second optical signal are synchronized.

The first transmitter may be controllable or be provided with associated means for controllably interrupting the first optical signal from time to time and/or controllably transmitting a replacement optical signal instead of said first optical signal. Preferably, the means for transmitting the second optical signal have similar capabilities. Further, interruption of the second optical signal is preferably performed at these means synchronously with interruption of the first signal.

In one embodiment, said means for transmitting the second optical signal is a second transmitter associated with the second network element. The second transmitter may be adapted to controllably change the character and parameters of the second optical signal, to make it maximally difficult for separation from the first (information) optical signal.

The system may be adapted to serve an N-fiber (N≧2) bidirectional communication optical line additionally comprising at least a second optical fiber extending between the first network element and the second network element; the system then comprising:

a third transmitter for transmitting a third optical signal via said second optical fiber from the first network element to the second network element, at least one first optical or electrical switch for switching, from time to time, the first optical signal between the first optical fiber and the second optical fiber, and for synchronously switching the third optical signal between the second optical fiber and the first optical fiber, wherein the third optical signal is transmitted via the first optical fiber at the same said predetermined optical wavelength;

the system thereby improving security in the first optical fiber.

The first optical/electrical switch is preferably situated at the first network element and has two inputs and two outputs.

The system may further comprise:

means (for example, a transmitter) for transmitting a fourth optical signal via the second optical fiber from the second network element to the first network element, at least one second optical or electrical switch for switching, from time to time, the fourth signal between the second optical fiber and the first optical fiber, and for synchronously switching the second optical signal between the first optical fiber and the second optical fiber, thereby improving security in the second optical fiber.

The second switch is preferably situated at the second network element and has at least two inputs and two outputs.

For further improving security of data transmission, the system may comprise a first monitoring block for monitoring receipt of the first optical signal at the second network element, said first monitoring block being adapted, in case of determining a failure in transmission of the first optical signal, to cause urgent cease of transmission of the second optical signal via the optical fiber and at the optical wavelength via which and at which said first optical signal should have been transmitted.

Alternatively or in addition, the system may comprise a second monitoring block for monitoring receipt of the second optical signal at the first network element and, said second monitoring block being adapted, in case of determining a failure in transmission of the second optical signal, to cause urgent cease of transmission of the first optical signal via that optical fiber via which, and at that optical wavelength at which said second optical signal should have been transmitted.

Similar monitoring blocks may be provided in the system for monitoring receipt of other optical signals (third, fourth, etc.), for improving security of transmission in the optical line.

Preferably, the system comprises at least one optical polarization controller for applying polarization perturbation to at least one of at least two optical signals comprising at least the first optical signal and the second optical signal.

The system preferably comprises means for detecting various physical phenomena associated with a damage of optical fibers (at least of the first fiber), in order to determine, based on the detected phenomena, intrusive manipulations with the optical communication line.

According to a third aspect of the invention, there is provided a network element in an optical communication line comprising at least a first optical fiber extending between said network element and an opposite network element, said network element being provided with a receiver for receiving a first, information, optical signal carrying data via the first optical fiber from the opposite network element to said network element at a predetermined optical wavelength;

a means for transmitting a second, interference, optical signal via the first optical fiber in the opposite direction at the same predetermined optical wavelength, said second optical signal being such that to maximally complicate non-intrusive separation of the first optical signal from said combined optical signal.

The network element may further comprise at least one of the following: means for preventing launching of said second optical signal to the first optical fiber if said first optical signal is not received, a polarization controller for applying controllable polarization perturbation to the second optical signal, means for controllably changing parameters of the second optical signal, said network element being thereby capable of essentially complicating non-intrusive interception of data carried by the first optical signal.

The network element may comprise one or more tunable transmitters and suitable receivers, may be part of a multi-fiber optical communication line, may be further provided with switches, wavelength (channel) blockers, wavelength converters and the like for further securing transmission of data carried by at least the first optical signal.

BRIEF DESCRIPTION OF THE DRAWINGS

The invention will be further described and illustrated in more detail with reference to the following non-limiting drawings, in which.

DETAILED DESCRIPTION OF THE PREFERRED EMBODIMENTS

Figure 1:
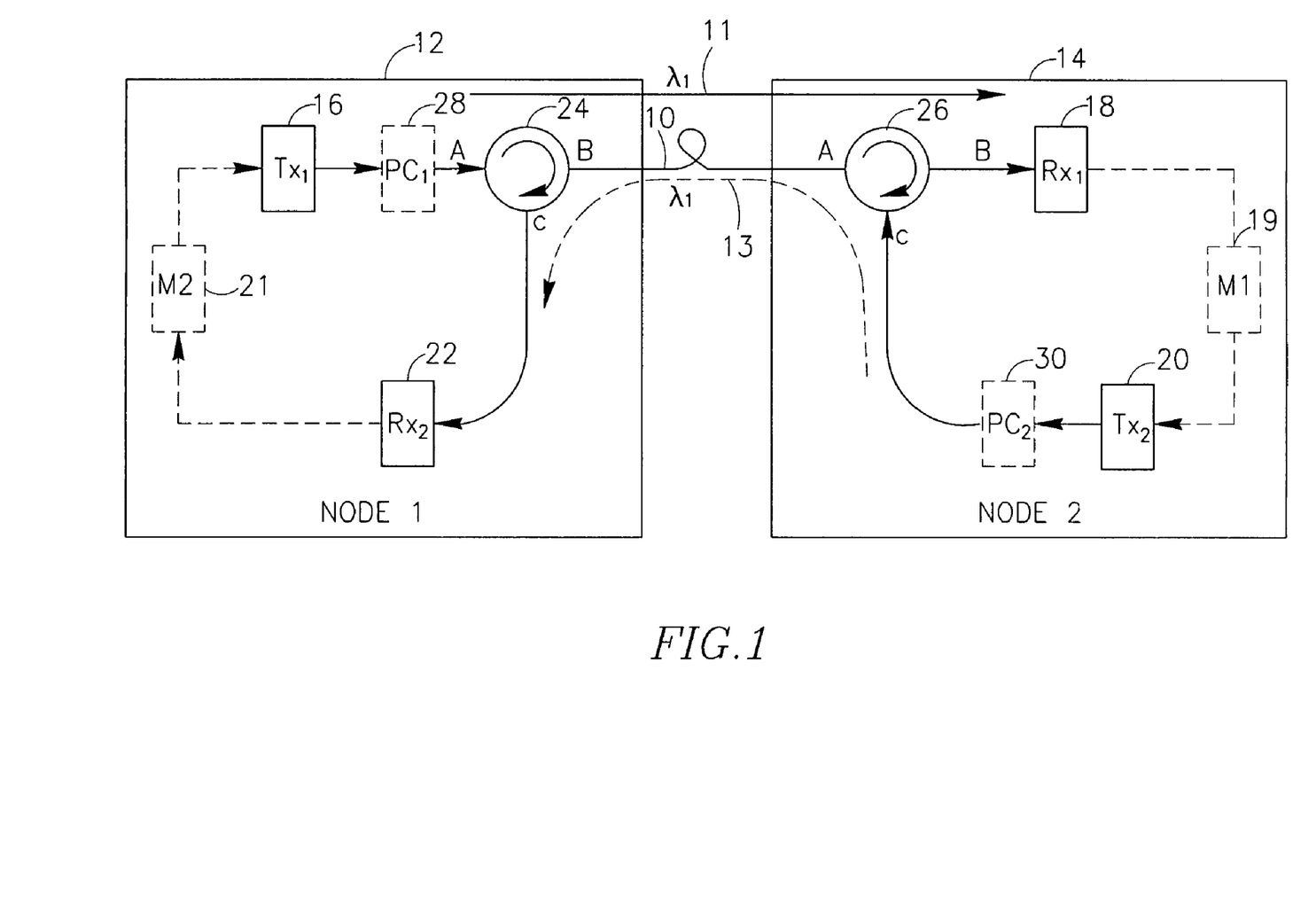
FIG. 1 schematically illustrates a basic embodiment of a single fiber bidirectional communication optical line equipped with various means for preventing non-intrusive interception of optical signals.

FIG. 1 illustrates a bidirectional single fiber optical line 10 extending between a first node 12 and a second node 14 in an optical network. A first transmitter (Tx1) 16, situated at the node 12, transmits a first (information) optical signal at the optical wavelength $\lambda 1$ via the line 10. The first optical signal is indicated by a solid arrow 11; it is received at the second node 14 by a receiver (Rx1) 18.

A second transmitter (Tx2) 20 transmits via the line 10 a counter-propagating second optical signal at the same wavelength $\lambda 1$, which can be received by a receiver (Rx2) 22 at the first node 12. The second optical signal is shown by a dashed arrow 13. The signal 13 is preferably a data signal having similar physical characteristics and parameters as the information signal 11, and is intended to serve as an interference signal for the information signal 11; i.e. to form together with it a combined illegible signal at $\lambda 1$ in the optical line 10. If the signal 13 is not an information signal itself, there is actually no need in receiving it and the receiver Rx2 could be not provided/used at all, or be provided and used for diagnostic purposes only.

Both transmitters 16 and 20 may be tunable and may be adapted to synchronously change the optical wavelength at which the signal 11 and the signal 13 are transmitted.

Optical circulators 24 and 26 are provided at the respective nodes 12 and 14 for organizing bidirectional transmission of the optical signals via the single fiber optical line 10. Instead of circulators, assemblies of optical splitters or the like can be used.

For further improving security of data transmission, receipt of the signal 11 is preferably monitored at the node 14 by a monitoring block M1 (19). In case the information signal 11 is not received (for example, due to a failure of the transmitter 16), the monitoring block 19 may turn off the transmitter 20 or may perform other actions to prevent launching of the signal 13 to the fiber 10 via the circulator 26. A similar monitoring block 21 is optionally (but preferably) provided at the node 12, for monitoring safe receipt of the interference signal 13. In the absence of the expected interference signal, transmission of the information signal from transmitter 16 can be immediately interrupted. It should be emphasized that, for shutting down transmitters 16,18 or otherwise preventing launching of their respective signals 11, 13 to the optical fiber line 10, there is no need in determining a fiber cut. The only criterion is disappearance of the optical signal 11 (13).

An intruder, if non-intrusively (i.e., without cutting the fiber) tries obtaining energy of the combined signal at λ1, carried by the optical fiber 10 between nodes 12 and 14, will most probably be unable to distinguish between signal 11 and signal 13. (It should be noted that if the fiber is cut, it allows inserting a circulator to divide the combined signal of one and the same wavelength into two unidirectional signals.) However, in order to make the task of non-intrusive interception totally unsolvable, the optical line is further provided with at least one polarization controller (PC). PC1 marked 28 is shown at the node 12, and PC2 marked 30—at the node 14. A polarization controller, say the PC1 28, introduces polarization perturbation into the information signal 11, thus further hampering the intruder's efforts to divide two signals without cutting the fiber. If polarization of the both signals is somehow disturbed, the task becomes even more complicated.

Any additional optical channel established in the optical fiber 10 may be provided with the data security equipment similar to that depicted in the figure.

Optical networks are usually provided with means for diagnosing fiber cuts in fiber lines; therefore intrusive manipulations with the lines can be detected accordingly. Those solutions are out of the scope of the present invention. In practice, most probably, equipment according to the present invention should be fulfilled with solutions for detecting intrusive manipulations—for preventing both intrusive and non-intrusive manipulations with data in optical networks.

Figure 2:
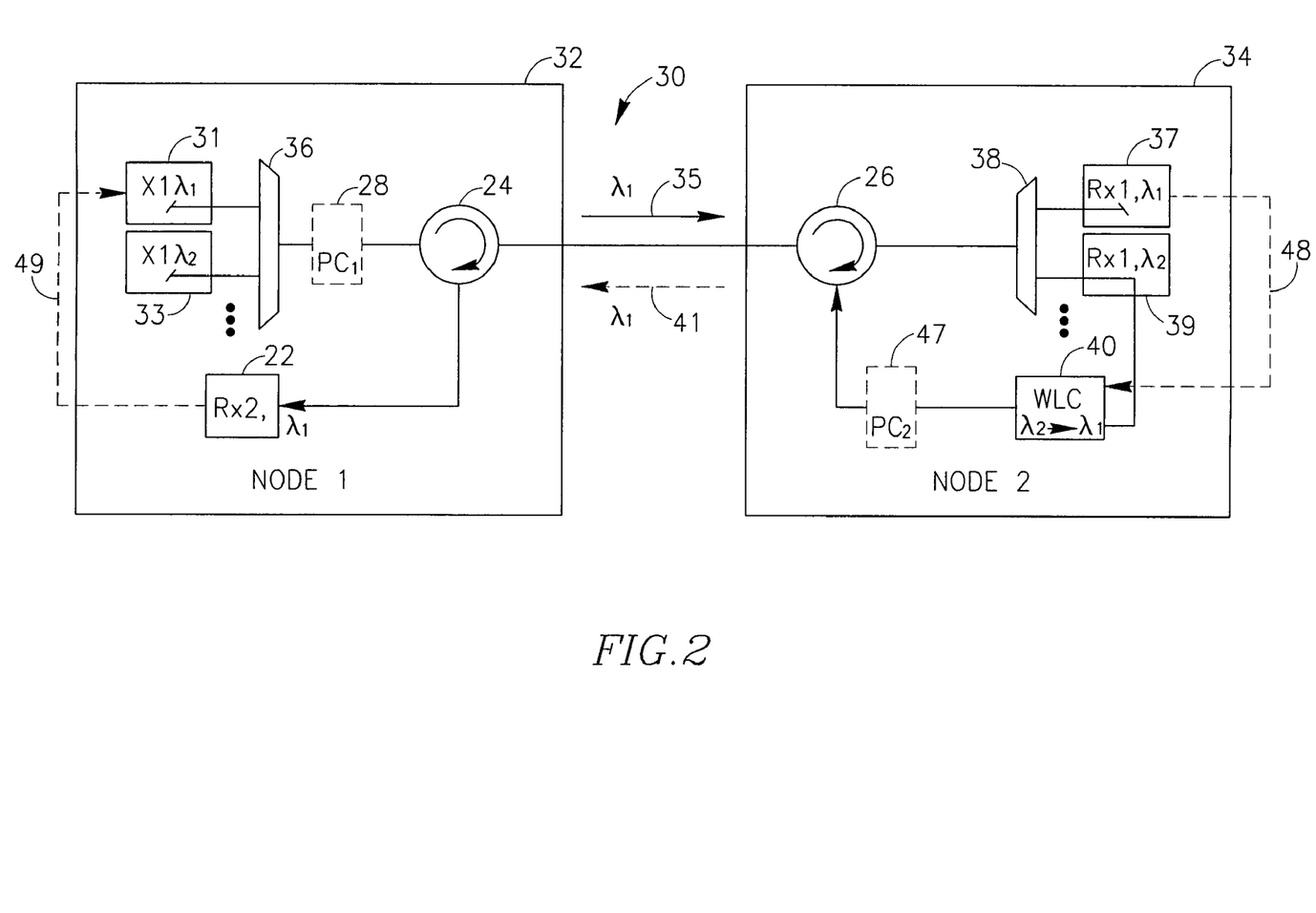
FIG. 2 illustrates another embodiment of the line shown in FIG. 1
Figure 3:
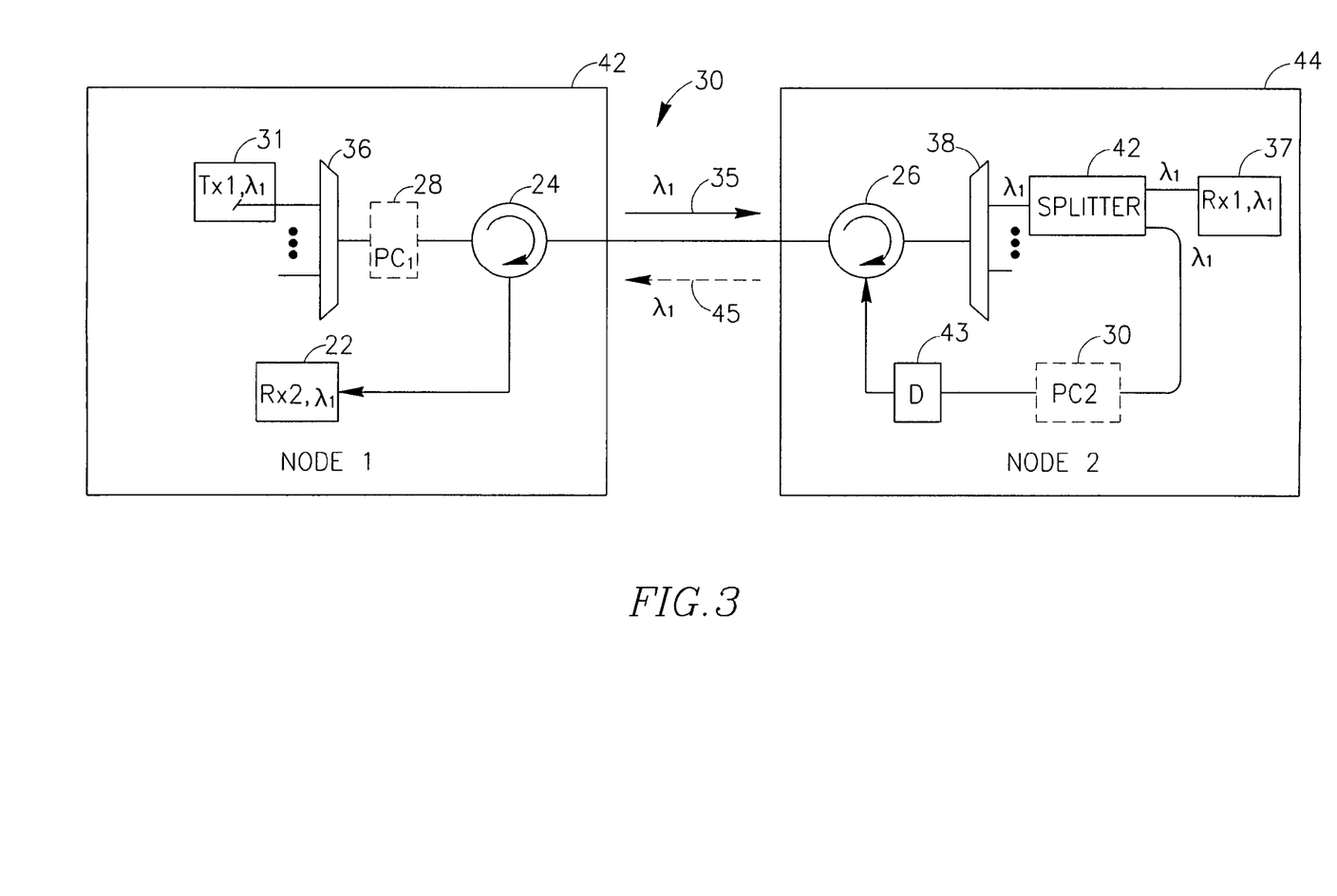
FIG. 3 illustrates yet another embodiment of the line of FIG. 1.

FIG. 2 and FIG. 3 illustrate two different embodiments of the single fiber optical bidirectional line provided with data securing means, configured more economically and comprising one transmitter instead of two per optical channel.

FIG. 2 illustrates a single fiber bidirectional line 30 for transmitting optical signals at two or more optical wavelengths between network nodes 32 and 34. Transmitters 31 and 33 are shown, producing signals at wavelengths λ1 (our first or information signal) and λ2 respectively and feeding them to a multiplexer 36 which, via an optical circulator 24 and an optional polarization controller 28, launches the multiplexed signal onto the optical communication line 30. At the node 34, the multiplexed signal including our information signal 35 at λ1 passes via a demultiplexer 38 and is divided into channels; the information signal at λ1 is received by a receiver 37, and the signal at λ2—by a receiver 39. The signal at λ2 is then transformed by a wavelength converter 40 into a new signal at wavelength λ1 (the second optical signal 41), that signal is fed to the optical circulator 26 and then to the communication line 30 in the opposite direction. Polarization of the second signal may be dynamically changed by using an optional polarization controller 47. Operation of transmitter 31, receiver 22, receiver 37, and wavelength converter 40 can be synchronized (see dashed control arrows 48, 49) to prevent transmitting of a non-secured data signal or a non-secured interference signal in case of disappearance of one of these signals. Any other optical channel, characterized by a different optical wavelength, can be secured in the similar manner. The monitoring of receipt of optical signals and, based on that, control of transmission of the respective counter-propagation signals may be performed locally, as shown in FIG. 1 and FIG. 2, but may also be performed using a central control means (not shown).

FIG. 3 shows yet another option of obtaining the second counter-propagating optical signal. Upon receiving the multiplexed optical signal from the optical communication line 30 at a node 44, the signal is demultiplexed by the demultiplexer 38; the information signal at the wavelength λ1 is then split by an optical splitter 42, its phase is shifted by a delay line 43 and then fed to the communication line 30 in the opposite direction via the optical circulator 26. The first (information) optical signal is thus modified and then used as the second (interference) optical signal 45. The same reservations as above apply to the illustrated embodiment as well (i.e. the system may be provided with the proposed security measures for any additional optical channel in the line.

It should be noted that the embodiment illustrated in FIG. 2 is self-monitoring and self-securing, since if the first (information) optical signal disappears, the second (interference) optical signal will immediately disappear, too.

FIG. 3 also illustrates one possibility to control and modify the second signal in order to obtain it with parameters maximally close to those of the first signal, but in the form that allows mixing of the two signals into the combined signal which is actually non-separable by a non-intrusive manner.

Figure 4:
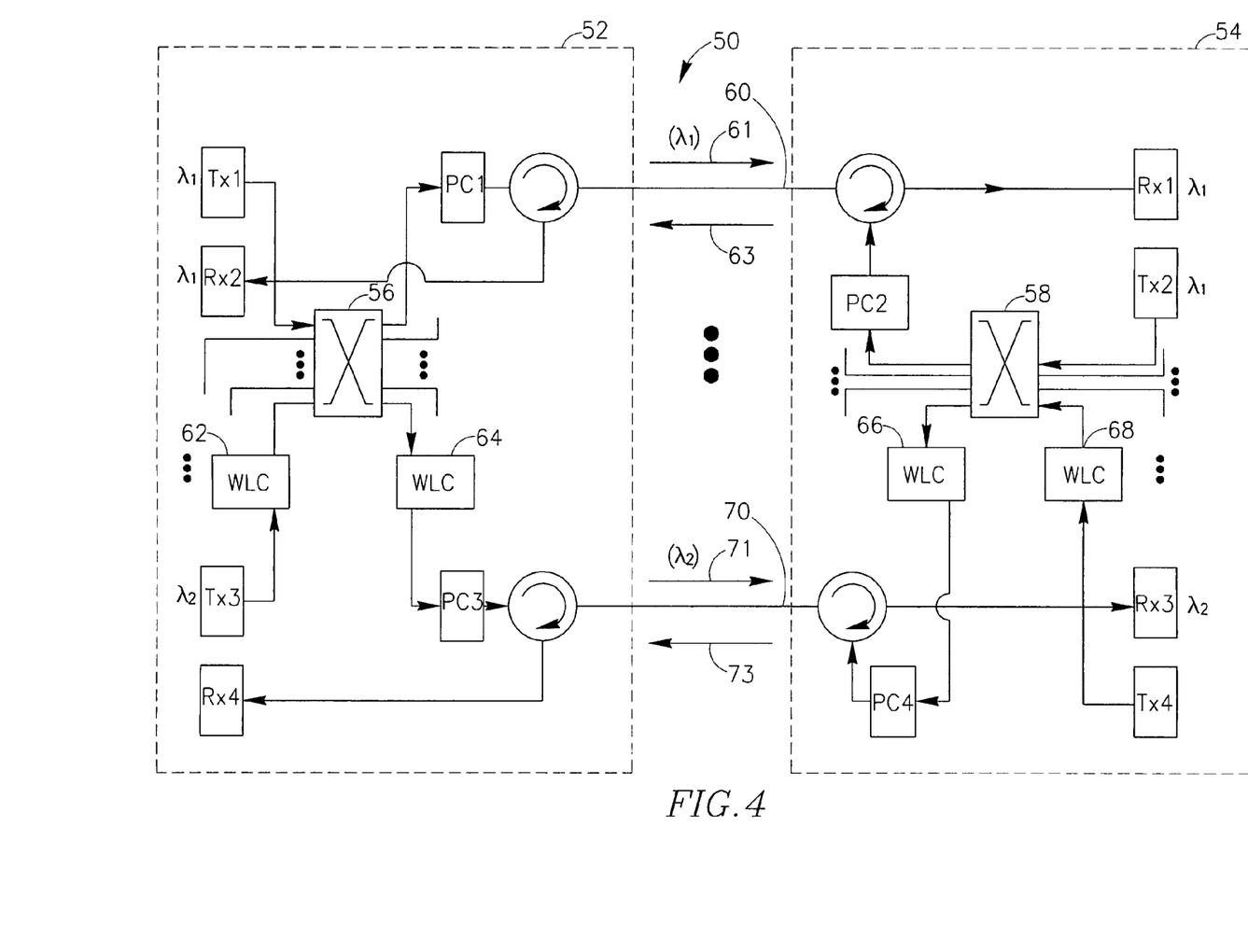
FIG. 4 schematically illustrates one embodiment of a multi-fiber bidirectional communication optical line equipped with means for preventing non-intrusive interception of optical signals.

FIG. 4 illustrates an embodiment of a multi-fiber bidirectional optical line 50 extending between node 52 and node 54, and comprises at least two optical fiber lines 60 and 70 shown in the drawing.

As usually happens in practice, bidirectional optical communication lines such as 50 are utilized for transmitting various information optical signals in both directions, via different optical fibers and using various optical channels (wavelengths). According to the invention, at least some information optical signals in the system 50 may be used as interference signals for at least some of the remaining information optical signals. It can be performed in each specific fiber according to various models, for example the models shown in FIGS. 1, 2, 3. However, the system for data security in such a multi-fiber bidirectional line can be built using its intrinsic multi-fiber character.

For the sake of simplicity, node 52 of FIG. 4 is illustrated as accommodating:
a) equipment Tx1, Rx2 for transmitting/receiving signals at only one optical wavelength (λ1) via an optical fiber 60, and
b) equipment Rx3, Tx4 for transmitting/receiving signals at only one optical wavelength (say, λ2) via an optical fiber 70.

The opposite end node 54 is built symmetrically and comprises equipment Rx1, Tx2 for the optical fiber 60 and equipment Rx3, Tx4 for the optical fiber 70.

Let us assume that in the present example fiber 60 carries a first (information) optical signal 61 in one direction, and a second (interference) optical signal 63 in the opposite direction, both signals are transmitted at the wavelength λ1. Further in our example, fiber 70 carries a third (information) optical signal 71 in one direction, and a fourth (interference) optical signal 73 in the opposite direction, both signals are transmitted at wavelength λ2.

The nodes 52, 54 comprise means for dividing the optical signals by directions (say, the optical circulators as in FIGS. 1-3) and optionally comprise at least one polarization controller (say, as those shown in FIGS. 1-3) for controllably changing polarization of the optical signal(s) being launched on the communication line 50. That equipment is mentioned with respect to the optical wavelengths (channels) λ1 and λ2.

The system is further provided with one or more multi-input and multi-output controlled optical or electrical switches (two switches 56, 58 are shown) for controllably exchanging (switching) optical signals between optical fibers. For a case when the optical signals being exchanged are not initially transmitted at one and the same optical wavelength, the switches are further associated with optional wavelength conversion blocks (four such blocks are shown and marked 62, 64, 66, 68). It goes without saying that if two optical signals (say, the first signal 61 and the third signal 71) are controllably switched to replace one another so that the signal 61 starts being transmitted via the fiber 70 and the signal 71—via the fiber 60, the equipment at node 54 (a plurality of receivers) should be prepared to controllably receive these signals at different assigned fibers during the controlled period known in advance. In other words, control of the switch 56 should be synchronized with control of the receivers Rx1 and Rx3.

Synchronization of receivers and transmitters of counter-propagating signals in one and the same channel (to exclude cases when only a unidirectional signal is transmitted in an optical channel which should be secured) is preferably performed, but not illustrated in the drawing.

The system may also comprise means for controllably changing parameters of the one or more interference signals, preferably in response to changes of their mating information signal(s).

In the simplest case, the switches (56, 58 and other if exist) may be just 2×2 optical switches. However, optical (or electrical) switches with more than two inputs and more than two outputs may be installed for performing complex switching operations between more than two optical fibers, if required. The complex switches may have n inputs and m outputs, $m \geq n$. Two or more copies of one optical signal can be used for various switching operations.

Figure 5:
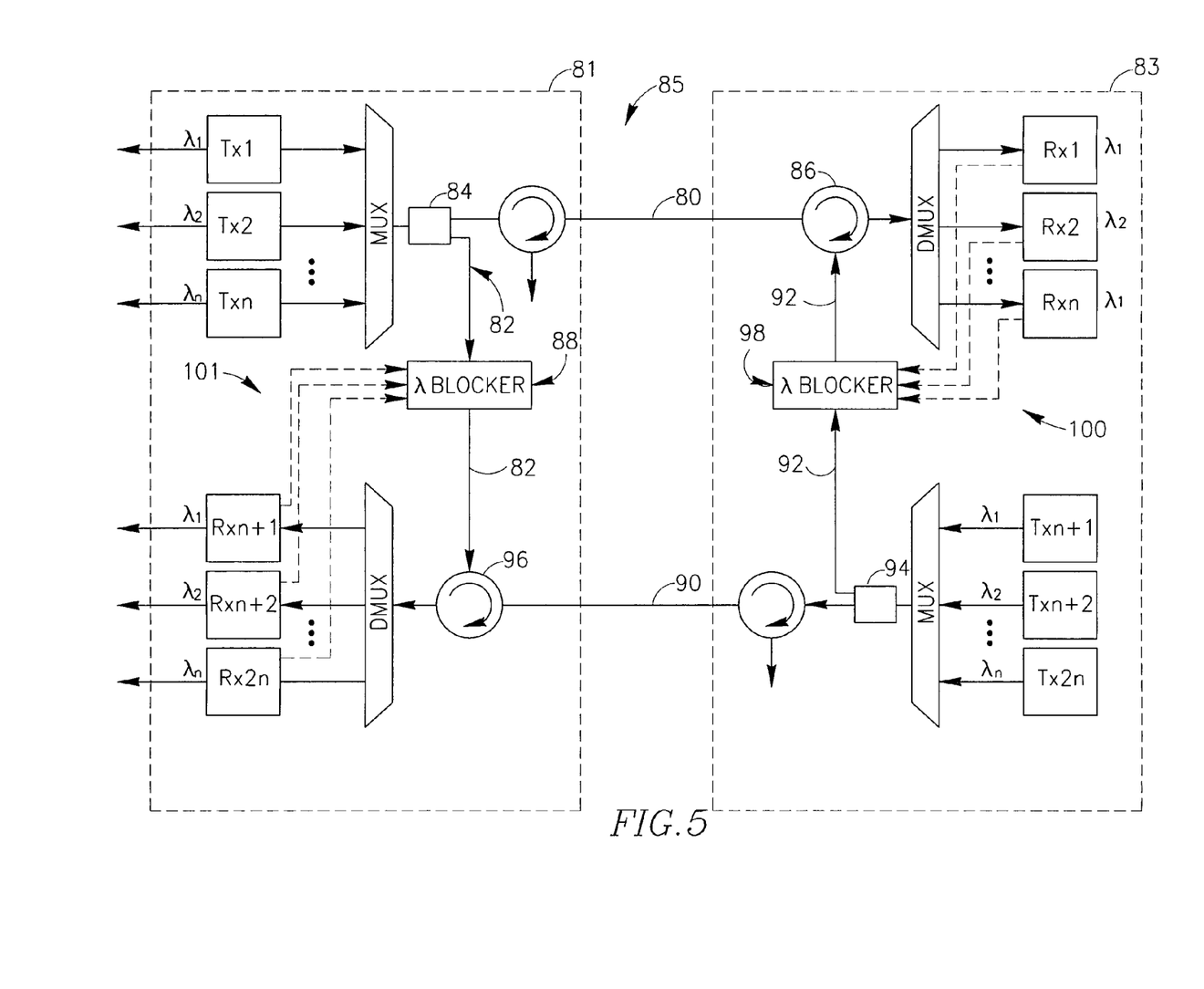
FIG. 5 schematically illustrates one embodiment of a dual-fiber bidirectional transmission system for secured transmission of multiple optical channels in both directions.

FIG. 5 illustrates a specific implementation of a WDM (Wavelength Division Multiplexing technology) bidirectional dual-fiber optical communication line 85, where N optical channels ($\lambda 1$ to $\lambda N$) are established in both directions, along both optical fibers 80 and 90, and all these optical channels are used for transmitting information signals in both directions. The exemplary system of FIG. 5 comprises transmitters Tx1–TxN and TxN+1–Tx2N, receivers Rx1–RxN and RxN+1–Rx2N, two multiplexers MUX, two demultiplexers DMUX, four optical circulators and two optical splitters.

In this embodiment, the information signals transmitted along optical channels $\lambda 1$ to $\lambda N$ in one direction via one of the fibers (say, a first fiber 80) are used as interference signals transmitted in the same direction, along the same respective optical channels $\lambda 1$ to $\lambda N$, but via the other (second) optical fiber 90. To this end, this exemplary system comprises an optical connection 82 between the optical splitter 84 and the optical circulator 96, and an optical connection 92 between the optical splitter 94 and the optical circulator 86.

For preventing transmission of a lonely, unsecured optical signal along any of the optical channels $\lambda 1$ to $\lambda N$ if one of the required counter-propagating optical signals non-expectedly disappears, the system is provided with a pair of channel blocker assemblies 88 and 98. These channel blockers permanently receive control signals (dashed lines) from receivers Rx1–RxN (100) and RxN+1–Rx2N (101) or from monitoring units associated there-with (not shown). For example, in case an optical signal in a specific optical, channel ($\lambda 1$) is not received at the receiver RxN+1, the suitable control signal will block transmission of an optical signal along that specific optical channel $\lambda 1$ via the blocker 88. As a result, no optical signals will be transmitted via the optical fiber 90 along the channel $\lambda 1$, thus an intruder will not be given a chance to intercept unsecured data.

Structure of the channel blockers 88 and 98 can be understood by those skilled in the art.

The security system of the communication line 85 may comprise additional security means such as polarization controllers, switches for controllably switching optical signals between fibers 80 and 90, delay lines, wavelength converters, etc.

It should be appreciated that slight changes in the proposed method and arrangement of the system are possible and still constitute part of the present invention, while covered by the patent claims that follow.

It is appreciated that various features of the invention that are, for clarity, described in the contexts of separate embodiments may also be provided in combination in a single embodiment. Conversely, various features of the invention which are, for brevity, described in the context of a single embodiment may also be provided separately or in any suitable sub-combination.

It will be appreciated by persons skilled in the art that the present invention is not limited by what has been particularly shown and described herein above. Rather the scope of the invention is defined by the claims that follow.

The invention claimed is:

1. A method for securing transmission of data via an optical communication line comprising a first optical fiber extending between a first network element and a second network element, the method comprising:
   conveying a first optical signal carrying said data via the first optical fiber from the first network element towards the second network element at a predetermined optical wavelength;
   conveying a second, disruptive interference optical signal via the first optical fiber at the same predetermined optical wavelength in the opposite direction to create within the first optical fiber a combined optical signal at said predetermined optical wavelength, so that
   said combination of said first and second optical signals hampers an unauthorized non-intrusive extraction of the first optical signal from said combined optical signal,
   the method further comprising the following operations:
   from time to time switching transmission of the first optical signal to carry said data at another predetermined optical wavelength, without changing direction of its transmission;
   from time to time switching transmission of the second optical signal to said another predetermined optical wavelength, without changing direction of its transmission, wherein the switching of the second signal is synchronized with the switching of said first signal.

2. The method according to claim 1, further comprising applying polarization perturbation to at least one of two optical signals being the first optical signal and the second optical signal.

3. The method according to claim 1, further comprising controllably changing parameters of the second optical signal, to further hamper distinguishing of the first signal from the second signal.

4. The method according to claim 1, wherein the optical communication line further includes at least a second optical fiber extending between the first network element and the second network element, the method further comprising the following steps:
   conveying a third optical signal via said second optical fiber from the first network element towards the second network element;
   from time to time, switching the first optical signal between the first optical fiber and the second optical fiber, and synchronously switching the third optical signal between the second optical fiber and the first optical fiber, in such a manner that the third optical signal be conveyed via the first optical fiber at the predetermined optical wavelength.

5. The method according to claim 4, further comprising conveying a fourth optical signal via the second optical fiber from the second network element to the first network element.

6. The method according to claim 5, further comprising switching, from time to time, the second optical signal between the first optical fiber and the second optical fiber, and synchronously with that switching the fourth optical signal between the second optical fiber and the first optical fiber, while providing conveying the fourth optical signal via the first optical fiber at said predetermined optical wavelength.

7. The method according to claim 1, comprising a step of monitoring receipt of at least one optical signal among two optical signals including the first optical signal and the second optical signal; in case of determining a failure in transmission of one of said two optical signals, urgently ceasing transmission of the other of said two optical signals via the optical fiber along which, and at the optical wavelength using which said other optical signal should have been transmitted.

8. A system for securing transmission of data via an optical communication line comprising a first optical fiber extending between a first network element and a second network element;
the system comprising:
a first transmitter associated with the first network element, for transmitting a first optical signal carrying data via the first optical fiber from the first network element towards the second network element at a predetermined optical wavelength;
a second transmitter associated with the second network element, for transmitting an optical signal via the first optical fiber from the second network element towards the first network element, at the same predetermined optical wavelength to create a combined optical signal at said wavelength within the first optical fiber, wherein the second optical signal being a disruptive, interference signal selected so that the combination of the first and second optical signals hampers an unauthorized non-intrusive extraction of the first optical signal from said combined optical signal,
wherein
said first transmitter is tunable and capable of switching, from time to time, to transmit the first optical signal carrying said data at another predetermined optical wavelength;
said means for transmitting the second optical signal are capable of switching, from time to time, to transmit the second optical signal at said another predetermined optical wavelength; and
the switching of said first transmitter and the switching of said means for transmitting the second optical signal are synchronized.

9. The system according to claim 8, wherein the first transmitter is provided with associated means capable of at least one of the following: controllably interrupting the first optical signal from time to time, and controllably transmitting a replacement optical signal instead of said first optical signal.

10. The system according to claim 8, wherein said means for transmitting the second optical signal is a second transmitter located at the second network element, adapted to controllably change the character and parameters of the second optical signal to make it maximally difficult for separation from said combined signal.

11. The system according to claim 8, adapted to serve an N-fiber (N≧2) bidirectional communication optical line additionally comprising at least a second optical fiber extending between the first network element and the second network element; the system comprising:
a third transmitter for transmitting a third optical signal via said second optical fiber from the first network element to the second network element,
at least one first optical or electrical switch for switching, from time to time, the first optical signal between the first optical fiber and the second optical fiber, and for synchronously switching the third optical signal between the second optical fiber and the first optical fiber, wherein said third signal is transmitted via said first optical fiber at the same said predetermined optical wavelength;
thereby improving data security in the first optical fiber.

12. The system according to claim 11, further comprising:
means for transmitting a fourth optical signal via the second optical fiber from the second network element to the first network element,
at least one second optical or electrical switch for switching, from time to time, the fourth signal between the second optical fiber and the first optical fiber, and for synchronously switching the second optical signal between the first optical fiber and the second optical fiber,
thereby improving transmission security in the second optical fiber.

13. The system according to claim 8, for serving a WDM bidirectional optical communication line comprising at least two optical fibers: a first optical fiber and a second optical fiber, wherein
N optical channels respectively assigned to optical wavelengths λ1 to λN are established in both directions along each of said two optical fibers, and all said optical channels are used for transmitting information signals in both directions; and
the information signals transmitted along optical channels λ1 to λN in one direction via one of the two fibers are used as interference signals transmitted in the same direction, along the same respective optical channels λ1 to λN, but via the other of the two optical fibers;
wherein the system is provided with means for monitoring receipt of any of said information signals, and with means for blocking transmission of any of said information signals as an interference signal; the arrangement being such that whenever a specific information signal is not received, another information signal otherwise serving as an interference signal for said specific information signal is prevented from being used as the interference signal for said specific information signal.

14. The system according to claim 8, further comprising means for detecting physical phenomena associated with a damage of said at least the first optical fiber, to manifest possible intrusive manipulations with the optical communication line.

15. A network element in an optical communication line comprising at least a first optical fiber extending between said network element and an opposite network element, said network element being provided with
a receiver for receiving a first, information, optical signal carrying data via the first optical fiber from the opposite network element to said network element at a predetermined optical wavelength;
a means for conveying a second, interference, optical signal via the first optical fiber in the opposite direction and at the same predetermined optical wavelength, said second optical signal being such that to disrupt the first signal and thus hamper unauthorized non-intrusive separation of the second optical signal from said first optical signal, the network element further comprising at least one of the following:

means for preventing launching of said second optical signal to the first optical fiber if said first optical signal is not received, a polarization controller for controllably applying polarization perturbation to the second optical signal;

means for controllably changing parameters of said second signal;

wherein said network element is thereby capable of essentially complicating non-intrusive interception of data carried by the first optical signal.

16. A system for securing transmission of data an optical communication line comprising a first optical fiber extending between a first network element and a second network element;

the system comprising:

a first transmitter associated with the first network element, for transmitting a first optical signal carrying data via the first optical fiber from the first network element towards the second network element at a predetermined optical wavelength;

a second transmitter associated with the second network element, for transmitting an optical signal via the first optical fiber from the second network element towards the first network element, at the same predetermined optical wavelength to create a combined optical signal at said wavelength within the first optical fiber, wherein the second optical signal being selected so that the combination of the first and second optical signals is adapted to hamper an unauthorized non-intrusive extraction of the first optical signal from said combined optical signal, wherein said first transmitter is tunable and capable of switching, from time to time, to transmit the first optical signal carrying said data at another predetermined optical wavelength;

said means for transmitting the second optical signal are capable of switching, from time to time, to transmit the second optical signal at said another predetermined optical wavelength;

the switching of said first transmitter and the switching of said means for transmitting the second optical signal are synchronized;

said system being further adapted for serving a WDM bidirectional optical communication line comprising at least two optical fibers: a first optical fiber and a second optical fiber; wherein N optical channels respectively assigned to optical wavelengths $\lambda 1$ to $\lambda N$ are established in both directions along each of said optical fibers, and all said optical channels are used for transmitting information signals in both directions;

the information signals transmitted along optical channels $\lambda 1$ to $\lambda N$ in one direction via one of the two fibers are used as interference signals transmitted in the same direction, along the same respective optical channels $\lambda 1$ to $\lambda N$, but via the other of the two optical fibers;

the system being provided with means for monitoring receipt of any of said information signals, and with the means for blocking transmission of any of said information signals as an interference signal; the arrangement being such that whenever a specific information signal is not received, another information signal otherwise serving as an interference signal for said specific information signal is prevented from being used as the interference signal for said specific information signal.

* * * * *